(12) United States Patent
Faustinelli

(10) Patent No.: US 6,511,041 B2
(45) Date of Patent: Jan. 28, 2003

(54) PLANAR-DIVERGENT VALVE INSERT

(75) Inventor: Juan G. Faustinelli, Maracaibo-Zulia (VE)

(73) Assignee: Intevep, S. A., Caracas (VE)

( * ) Notice: Subject to any disclaimer, the term of this patent is extended or adjusted under 35 U.S.C. 154(b) by 0 days.

(21) Appl. No.: 09/736,552

(22) Filed: Dec. 13, 2000

(65) Prior Publication Data

US 2002/0070369 A1 Jun. 13, 2002

(51) Int. Cl.[7] ............................................... F16K 47/00
(52) U.S. Cl. ...................... 251/118; 251/124; 251/125; 251/123
(58) Field of Search ................................. 257/118, 123, 257/124, 125, 333; 137/625.3

(56) References Cited

U.S. PATENT DOCUMENTS

| | | | | |
|---|---|---|---|---|
| 2,759,429 A | * | 8/1956 | Bubb | 137/155 |
| 2,869,475 A | * | 1/1959 | Bobo | 137/155 |
| 3,097,666 A | * | 7/1963 | Antrim et al. | 137/515.5 |
| 3,379,408 A | * | 4/1968 | Lowery | 251/298 |
| 3,868,965 A | * | 3/1975 | Noiles et al. | 137/559 |
| 4,055,179 A | * | 10/1977 | Manschot et al. | 251/333 |
| 4,251,191 A | * | 2/1981 | Gass et al. | 251/129.07 |
| 4,295,795 A | * | 10/1981 | Gass et al. | 137/155 |
| 4,446,883 A | * | 5/1984 | Paul, Jr. | 137/315.18 |
| 5,375,813 A | * | 12/1994 | Rozinsky | 251/333 |

\* cited by examiner

Primary Examiner—Henry C. Yuen
Assistant Examiner—D. Austin Bonderer
(74) Attorney, Agent, or Firm—Bachman & LaPointe, P.C.

(57) ABSTRACT

A gas-lift valve includes a valve member having an inner wall defining a flow passage having a longitudinal axis, the valve member having a planar inlet end and an outlet end, the inner wall diverging from the inlet end to the outlet end so that the flow passage increases in cross sectional area from the inlet end to said outlet end.

4 Claims, 4 Drawing Sheets

PLANAR-DIVERGENT VALVE INSERT

BACKGROUND OF THE INVENTION

The present invention relates to gas valves for use in gas-lift production wells wherein a fluid is produced from a subterranean formation through a production tube and gas is introduced into the production tube to enhance production.

In the course of pumping hydrocarbons from subterranean formations, the formation is typically under pressure which can be utilized to drive the desired fluid through a production tube and to the surface. As fluids are produced, the natural formation pressure tends to drop, and can reach a point where production is at undesirably low flow rates.

Various methods are utilized for enhancing production from such a well. One such method is gas-lift techniques wherein gas is introduced into the production tube at various points along the production tube so as to lighten the hydrocarbon within the production tube and enhance production.

In the course of injecting has into the production tube, it is desirable to maintain gas injection rates substantially constant so as to avoid erratic operation of the well. Gas is frequently provided by pumps and other units for injection into the well, the this typically provides the gas at fluctuating pressures and/or flow rates. This can least to unstable performance or a gas-lift well, which is certainly undesirable.

An unstable performance can be avoided by utilizing a valve at the point of injection and by establishing critical flow through the valve such that fluctuations in gas pressure upstream of the valve are not transmitted beyond the valve.

FIG. 1 illustrates a conventional square edged valve used for such a purpose. Unfortunately, with a valve structure as illustrated in FIG. 1, a large pressure differential is needed to reach critical flow, and the critical flow rate is not as large as would be desired.

FIG. 2 shows another prior art valve structure, which is also disclosed in U.S. Pat. No. 5,743,717. In this valve, an inlet nozzle and outlet venturi are provided, and this structure provides critical flow at a smaller pressure differential as compared to the structure FIG. 1. Unfortunately, the structure of FIG. 2 requires relatively complex techniques during manufacture so as to provide for the smooth inlet nozzle and the like, and this structure prevents satisfactory use of such a valve in gas-lift applications and as an unloading valve.

The need remains, therefore, for a cost effective valve which is suitable for providing critical flow at small pressure differential between injection pressure and tubing pressure, and which provides critical flow at a flow rate which is substantially higher than conventional square valves.

It is therefore the primary object of the present invention to provide such a valve.

It is a further object of the present invention to provide a valve which is excellent in providing critical flow at relatively small pressure differentials for use as a gas operation valve, and which also can be utilized as an unloading valve.

It is a further object of the present invention to provide a gas-lift system utilizing such a valve.

Other objects and advantages of the present invention will appear hereinbelow.

SUMMARY OF THE INVENTION

In accordance with the present invention, the foregoing objects and advantages have been readily attained.

According to the invention, a gas-lift valve is provided which comprises a valve member having an inner wall defining a flow passage having a longitudinal axis, said valve member having a planar inlet end and an outlet end, said inner wall diverging from said inlet end to said outlet end so that said flow rate passage increases in cross sectional area from said inlet end to said outlet end.

In further accordance with the invention, a gas-lift system for controlling flow from an external gas source into a production tube is provided, which system comprises a production tube for conveying fluid from a subterranean source to surface level; a conduit for communicating an interior of said production tube with a location exterior of said production tube; and a valve member positioned in said conduit and having an inner wall defining a flow passage having longitudinal axis, said valve member having a planar inlet end and an outlet end, said inner wall diverging from said inlet end to said outlet end so that said flow passage increases in cross sectional area from said inlet end to said outlet end.

BRIEF DESCRIPTION OF THE DRAWINGS

A detailed description of preferred embodiments of the present invention follows, with reference to the attached drawings, wherein.

DETAILED DESCRIPTION

The present invention relates to a gas-lift valve and, more particularly, to a valve insert member having a desirable geometry for accomplishing critical flow at desirable levels and at relatively small pressure differential, which valve has a structure that is relatively inexpensive to manufacture, and which further is suitable for use as an unloading valve.

Figure 1:
FIG. 1 illustrates one form of prior art valve.
Figure 2:
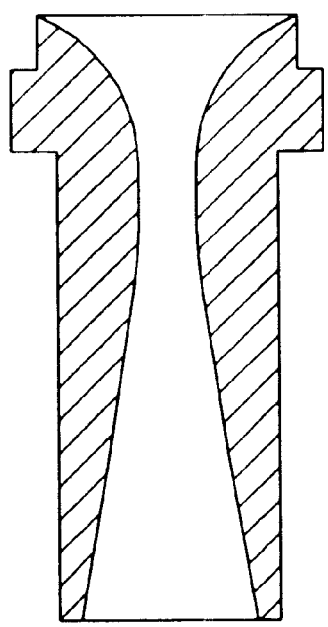
FIG. 2 illustrates another form of a prior art valve.

FIGS. 1 and 2 show prior art valves for use in gas injection techniques.

Figure 3:
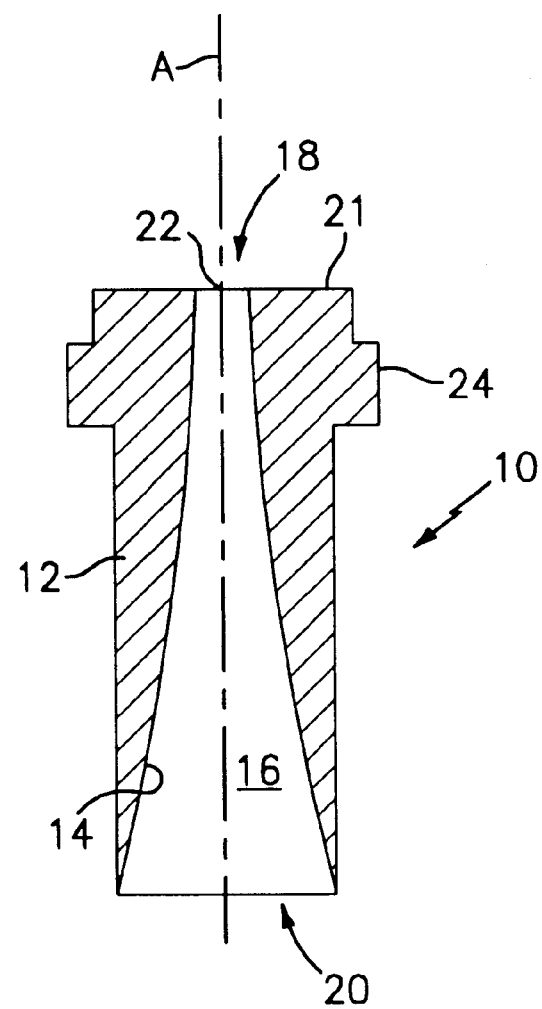
FIG. 3 is a side cross sectional view of a valve in accordance with the present invention.

FIG. 3 shows a side view of valve 10 in accordance with the present invention. Valve 10 has a wall member 12 which is preferably substantially cylindrical in shape and has an inner wall surface 14 defining a flow passage 16 through which gas can be injected into a production tube. Valve 10 has an inlet end 18 and an outlet end 21. Inlet end 18 is preferably a substantially planar surface 20 having an opening 22 formed therein as the inlet edge of flow passage 16.

As shown, inner wall surfaces 14 preferably diverge from inlet end 18 toward outlet end 20 such that the cross sectional area of flow passage 16 gradually increases in size from inlet end 18 to outlet end 20. In this embodiment, flow passage 16 is circular in shape and the radius increases from inlet end 18 to outlet end 20. Advantageously, wall surface 14 preferably diverges at a substantially constant slope, and defines flow passage 16 having a ratio of minimum cross sectional area to maximum cross sectional area of between about 0.071 and about 0.444.

As shown, valve 10 may suitably have a flange 24 or other structure which is used, as will be further illustrated below, for securing valve 10 in place during use.

As shown in FIG. 3, inlet end 18 is preferably a substantially planar surface, and planar surface 22 is preferably substantially perpendicular or transverse to a longitudinal axis A of flow passage 16 and valve 10. As will be further discussed below, this form of inlet advantageously allows valve 10 to be utilized not only as an operational gas injection valve, but also as a gas unloading valve, and use of such a structure as a gas unloading valve provides for further advantages in accordance with the present invention.

Figure 4:
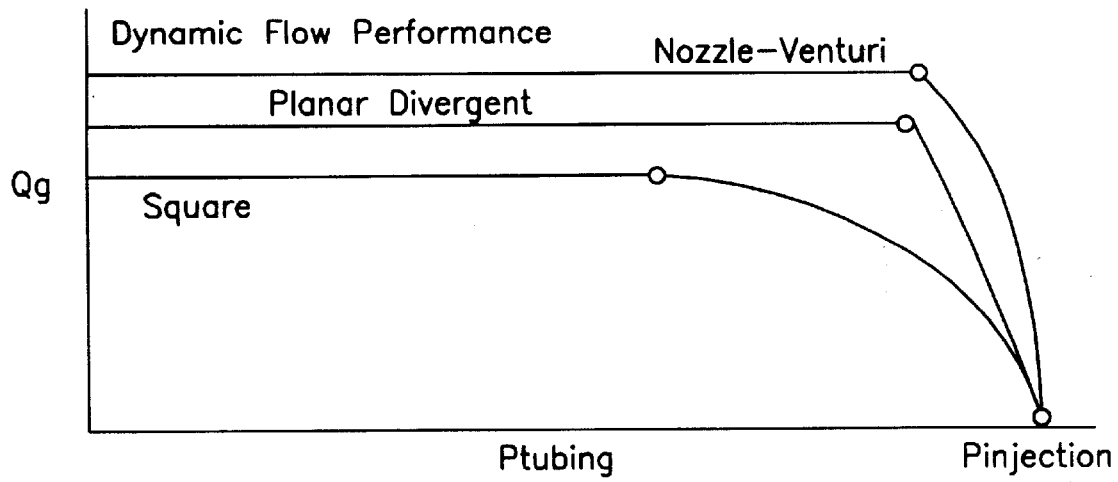
FIG. 4 graphically illustrates pressure differential needed to reach critical flow for the prior art valves of FIGS. 1 and 2 for the valve in accordance with the present invention of FIG. 3.

Turning now to FIG. 4, advantageous use of valve 10 in accordance with the present invention is further illustrated. One key problem in the industry is avoiding unstable gas injection operation. This could result, for example due to providing of gas from the external gas source at a varying flow rate and/or pressure. Unsteady gas injection into the production tube would result in unstable production conditions, which are undesirable.

Unstable operation is avoided through establishing critical flow through the valve such as the valves illustrated in FIGS. 1, 2 and 3. Critical flow is defined as the flow rate beyond which additional increases in pressure differential between the injection pressure and the tubing pressure do not increase flow rate through the valve.

FIG. 4 shows the flow rate ($Q_g$) for a prior art valve in accordance with FIG. 1 (square), for a nozzle-venturi style valve as shown in FIG. 2, and for the planar-divergent valve in accordance with the present invention. As shown, the critical flow rate for the square valve is lower than the other valves, and requires the greatest pressure differential to be obtained. The nozzle-venturi valve of FIG. 2 provides excellent results by reaching a substantially higher flow rate than the square valve at a substantially smaller pressure differential, but is expensive and can be problematic for use as an unloading valve. Valve 10 in accordance with the present invention also provides a substantially improved flow rate, at a substantially reduced pressure differential, as compared to the conventional valve of FIG. 1. Further, valve 10 in accordance with the present invention provides operation nearly as good as that of the prior art configuration of FIG. 2, at a cheaper manufacturing cost and in a form which is suitable for more versatile use than the embodiment of FIG. 2.

Figure 5:
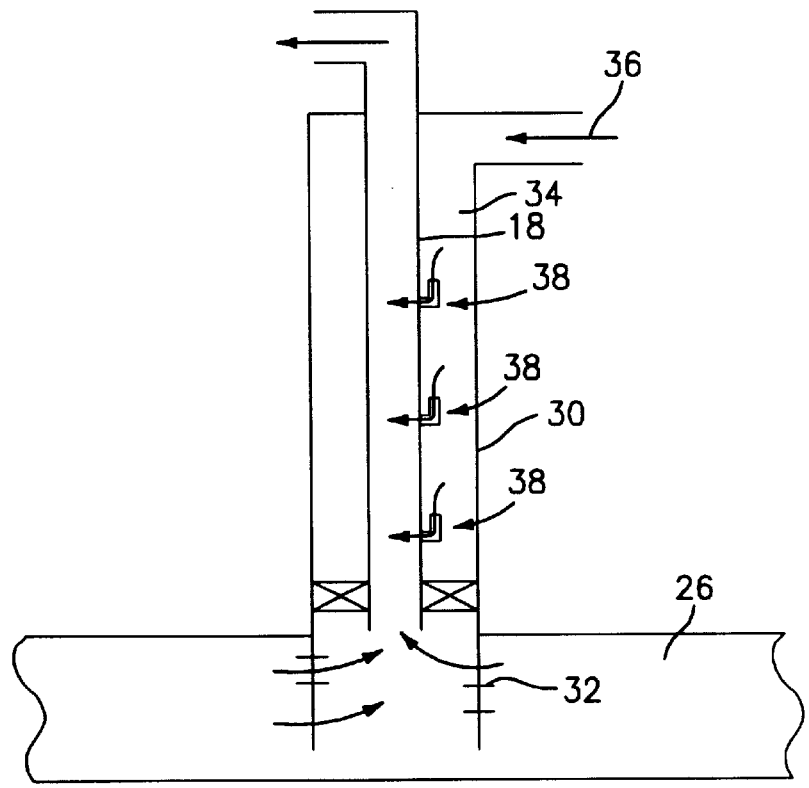
FIG. 5 illustrates an environment of use for the valve in accordance with the present invention.

Turning to FIG. 5, an environment of use of the valve of the present invention is further illustrated. As shown, oil and other types of hydrocarbon are typically desired to be produced from an oil bearing formation 26. Such production is typically accomplished through a production tube 28 which is positioned from a surface level to formation 26. Production tube 28 is typically positioned within a casing 30, with casing set into formation 26 with perforations 32 allowing the oil and other fluids to enter the well. Casing 30 and production tube 28 define therebetween an annulus 34 into which gas 36 is injected, and this gas flows through annulus 34 and conduits 38 to the interior of production tube 28 where the injected gas helps to lift fluid through production tube 28 and to the surface of production.

Conduits 38 communicate annular space 34 with the interior of production tube 28, and serve as a housing for installation of valve 10 in accordance with the present invention. FIG. 5 shows three conduits 38. The lowest conduit 38 is the operation valve and is the site where gas is injected deepest to assist in production. The middle and uppermost conduits 38 are areas which are operated as unloading valves, for further gas injection, so as to decrease fluid gradient and therefore tubing pressure and allow deeper injection of gas.

Figure 6:
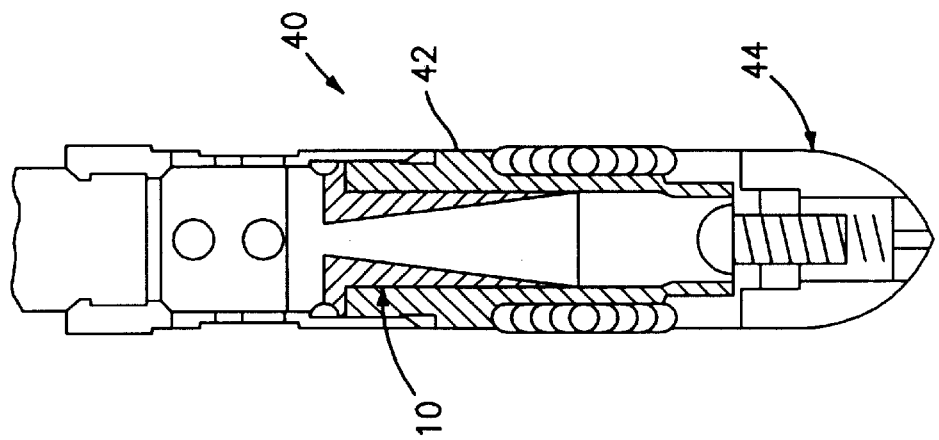
FIG. 6 illustrates a valve in accordance with the present invention in an insert member for disposal in a gas-lift system.

FIG. 6 shows an insert member 40 which can be used to mount valve 10 in accordance with the present invention within a conduit 28 of a well for use in gas-lift operation.

As shown, insert member 40 includes a substantially cylindrical shaped housing 42 for receiving valve 10 and having a pressure operated closure member 44 positioned to seal against a bottom portion of housing 42.

Figure 7:
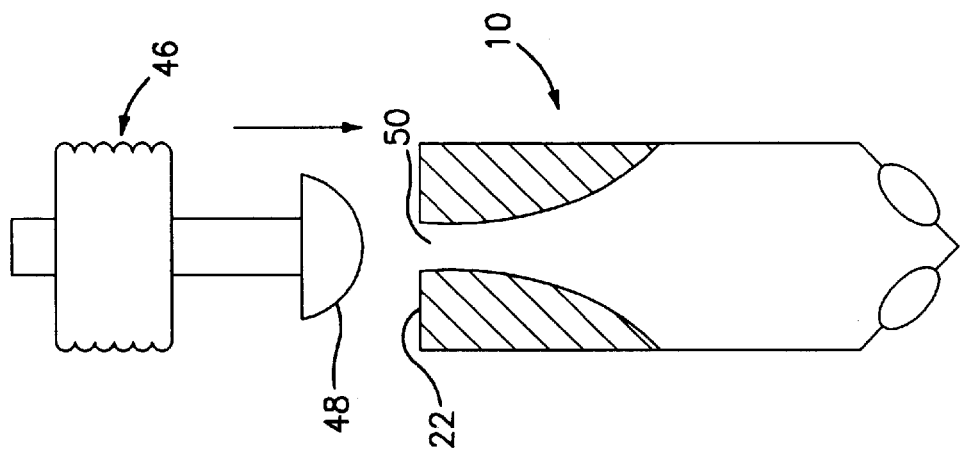
FIG. 7 schematically illustrates use of a valve in accordance with the present invention as an unloading valve.

In accordance with a further preferred embodiment of the present invention, valve 10 can advantageously be used as an unloading valve wherein sealing is accomplished against the inlet end of the valve. FIG. 7 schematically shows such a configuration, with valve 10 being associated with a seal member 46 having a head portion 48 which is positioned and adapted to sealingly engage opening 50 in planar inlet surface 22. In this environment of use, the advantageous flow characteristics of valve 10 in accordance with the present invention advantageously allow for sufficient unloading flow volume to be accomplished with a relatively small pressure differential. This provides for further advantageous operation of valve 10 when used as an unloading valve, thereby making the valve less dependent upon the remainder of the production system and thereby allowing the use of a reduced number of injection points or openings of the unloading gas-lift valves. Further, the provision of smaller flow passages results in higher closing valve pressures, which also allow placing of the unloading valves further apart (and thereby the use of less unloading valves), and/or allows injecting gas volumes deeper in a well (which increases the production rate).

Conventional orifice valves do not provide such benefits since the flow characteristics of same require large flow passage openings. Further, the nozzle-venturi valve of FIG. 2 results in a changed flow dynamic and adversely impacts upon the advantageous flow characteristics obtained utilizing the configuration of the present invention.

Figure 8:
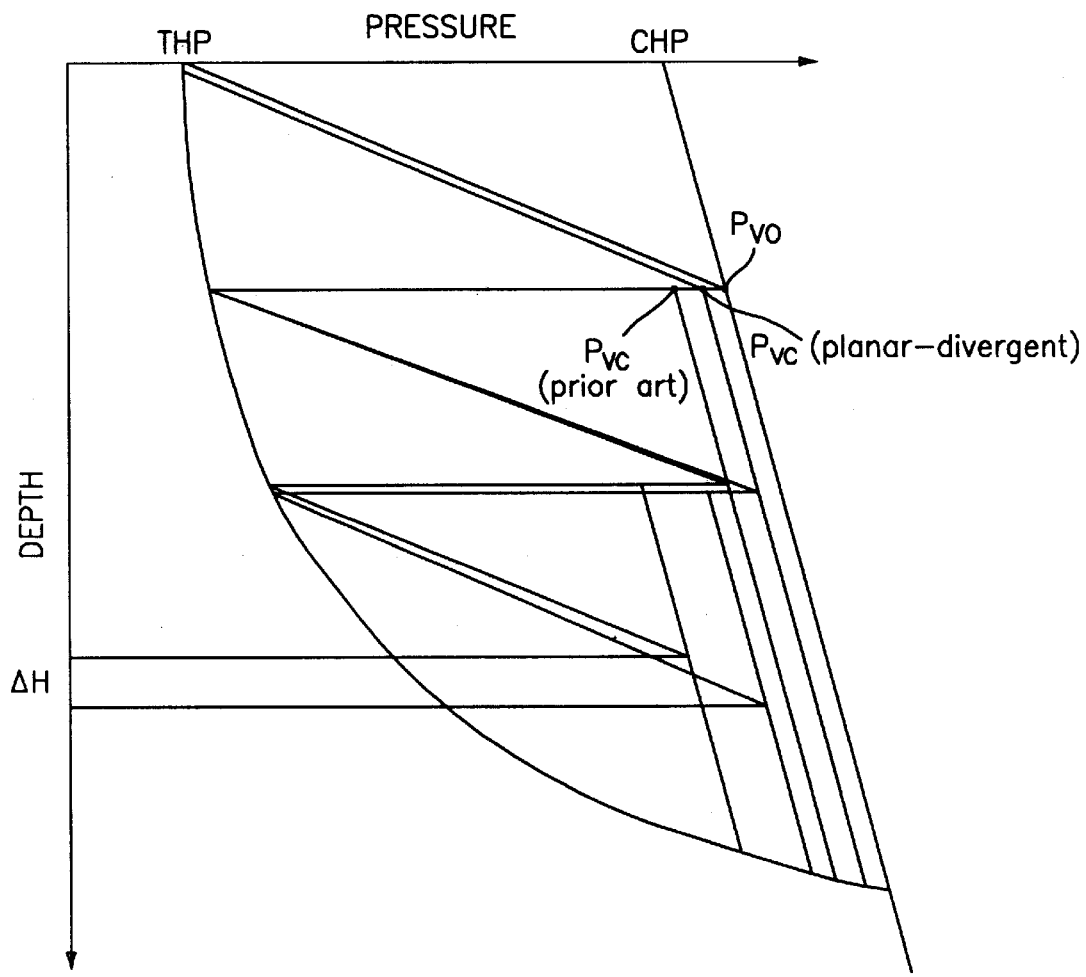
FIG. 8 comparatively illustrated results utilizing a valve in accordance with the present invention as an unloading valve as compared to results obtained utilizing a conventional square valve.

Turning now to FIG. 8, a comparison is illustrated as between well head pressure (THP) and surface injection pressure (CHP) for an unloading valve utilizing the structure of FIG. 1 (prior art) as compared to the same use of an unloading valve utilizing the structure of the present invention (planar-divergent). As shown, the valve in accordance with the present invention provides for a smaller pressure drop from opening pressure ($P_{vo}$) to closing pressure ($P_{vo}$) at each level, and therefor allows valves to be positioned at a deeper level along the well, which is desirable.

In accordance with the present invention, it should be readily appreciated that a valve has been provided which is simple and inexpensive to manufacture and which provides excellent results for use as both a gas injection or operation valve and also for unloading gas-lift valve, all in response to a substantial need in the art.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A gas-lift system for controlling flow from an external gas source into a production tube for enhancing production of fluid from said product tube, comprising:
   a production tube for conveying fluid from a subterranean source to surface level;
   a conduit for communicating an interior of said production tube with a location exterior of said production tube; and
   a valve member positioned in said conduit and having an inner wall defining a flow passage having a longitudinal axis, said valve member having a planar inlet end and an outlet end, said inner wall diverging from said inlet end to said outlet end so that said flow passage increases in cross sectional area from said inlet end to said outlet end wherein said valve passage of said valve member has a minimum cross sectional area at said inlet end and a maximum cross sectional area at said outlet end and wherein a ratio of said minimum cross sectional area to said maximum cross sectional area of said valve member is between about 0.071 and about 0.444.

2. The gas-lift system of claim 1, wherein said planar inlet end of said valve member is substantially perpendicular to said longitudinal axis.

3. The gas-lift system according to claim 1, wherein said inner wall of said valve member diverges at a substantially constant slope from said inlet end to said outlet end.

4. The gas-lift system according to claim 1, further including a plurality of said valve members positioned at different height locations in said conduit wherein at least one of said plurality of said valve members functions selectively as an unloading valve and as a gas lift valve.

* * * * *